(12) United States Patent
Nagayama et al.

(10) Patent No.: US 8,659,215 B2
(45) Date of Patent: Feb. 25, 2014

(54) MOTOR

(75) Inventors: Takashi Nagayama, Kanagawa-ken (JP); Shigetomo Shiraishi, Tokyo (JP)

(73) Assignee: Toshiba Corporation, Tokyo (JP)

( * ) Notice: Subject to any disclaimer, the term of this patent is extended or adjusted under 35 U.S.C. 154(b) by 300 days.

(21) Appl. No.: 13/229,129

(22) Filed: Sep. 9, 2011

(65) Prior Publication Data

US 2012/0062076 A1 Mar. 15, 2012

(30) Foreign Application Priority Data

Sep. 9, 2010 (JP) .................................. 2010-202100

(51) Int. Cl.
*H02K 5/00* (2006.01)

(52) U.S. Cl.
USPC ................................ 310/401; 310/89; 310/90

(58) Field of Classification Search
USPC ...................... 310/89–90, 401–415
See application file for complete search history.

(56) References Cited

U.S. PATENT DOCUMENTS

| | | | | |
|---|---|---|---|---|
| 2,781,463 A | * | 2/1957 | Sprando | 310/71 |
| 3,748,507 A | * | 7/1973 | Sieber | 310/58 |
| 4,742,257 A | * | 5/1988 | Carpenter | 310/62 |
| 4,766,337 A | * | 8/1988 | Parkinson et al. | 310/58 |
| 5,789,833 A | * | 8/1998 | Kinoshita et al. | 310/64 |
| 6,774,514 B2 | | 8/2004 | Matsuoka et al. | |
| 7,005,769 B1 | * | 2/2006 | Fisher et al. | 310/90 |
| 7,642,680 B2 | * | 1/2010 | Nagayama et al. | 310/58 |
| 2006/0226717 A1 | * | 10/2006 | Nagayama et al. | 310/58 |
| 2006/0261687 A1 | * | 11/2006 | Nagayama et al. | 310/58 |

FOREIGN PATENT DOCUMENTS

| | | |
|---|---|---|
| JP | 2008-029150 | 2/2008 |
| JP | 2008-099491 | 4/2008 |

* cited by examiner

*Primary Examiner* — Thanh Lam
(74) *Attorney, Agent, or Firm* — Baker Botts L.L.P.

(57) ABSTRACT

According to one embodiment, a motor has a cylindrical stator core and rotor. A first framework is fixed to a side of the stator core in an axial direction, and a first bearing housing is fixed to the outside of the first framework. A second framework is fixed to the other side of the stator core. A second bearing housing is fixed to the outside of the second framework. The rotor has a rotational shaft, supported by the bearings, extending into the frameworks. A rotor core is attached to the shaft. Support bases are fixed to the rotor, and are interposed by the rotor core. A locking member coupled to the first framework is configured to contact the first support base. A locking member coupled to the second framework is configured to contact the second support base. The rotor is fixed by the locking members contact with the support bases.

20 Claims, 6 Drawing Sheets

MOTOR

CROSS-REFERENCE TO RELATED APPLICATION

This application is based upon and claims the benefit of priority from Japanese Patent Application No. 2010202100, filed Sep. 9, 2010, the entire contents of which are incorporated herein by reference.

FIELD

Embodiments described herein relate to a motor for driving a railroad vehicle.

BACKGROUND

In general, a railroad vehicle (hereinafter referred to as "vehicle") has a main motor (hereinafter referred to as "motor") mounted on a bogie arranged below a body of the railroad vehicle. The rotating force of this motor is transmitted to wheels via gear mechanisms and joints, which causes the vehicle to run.

There is a growing need for a motor having an extended maintenance cycle, i.e., a motor requiring less maintenance. Accordingly, a totally-enclosed motor has been developed to satisfy this need.

This motor includes a stator core having a stator coil arranged on an inner peripheral side of a cylindrical frame and a housing and a bracket attached to both end sides of the frame to constitute an enclosed case, wherein each of the housing and the bracket includes bearings. A rotor shaft extends in the enclosed case. Both end portions of the rotor shaft are rotatably supported by the bearings. A rotor core is attached to a central portion of the rotor shaft, and the rotor core is located inside of the stator core. In the enclosed case, partition plates are attached to both end portions of the rotor shaft, and a labyrinth seal portion is formed between the bracket and an outer peripheral portion of each partition plate.

Recently, a permanent magnet motor is used more often in order to reduce heat of a rotor and to achieve a compact motor. In the permanent magnet motor, a permanent magnet, instead of a squirrel cage rotor, is inserted into a rotor core.

In the motor having the above structure, outside air does not circulate in the motor. Therefore, the inside of the motor is not contaminated with dust, and it is possible to save labor by eliminating the necessity of disassembling the motor to clean the inside. However, the bearings are lubricated with grease filled in bearing portions. The oil lubrication grease deteriorates as the motor operates, and it is necessary to replace the oil lubrication grease. The replacement of the oil lubrication grease is carried out upon disassembling the motor, which takes a lot of labor and time.

SUMMARY

According to one embodiment, a motor has a cylindrical stator core. A first framework is fixed to the first side of the stator core in an axial direction. A first bearing housing, which holds a bearing, is fixed to the outside of the first framework. A second framework is fixed to the second side of the stator core in an axial direction. A second bearing housing, which also holds a bearing, is fixed to the outside of the second framework. The motor also has a rotor including a rotational shaft that is rotatably supported by the bearings. The rotational shaft extends into the first and second frameworks. A rotor core is attached to the rotational shaft, and faces an inner side of the stator core. A first support base and a second support base are fixed to the rotor, and are interposed by the rotor core. A first locking member is movably coupled to the first framework, and is configured to move along an axial direction of the rotational shaft toward a side of the rotor core to contact the first support base and fix the rotor. A second locking member is movably coupled to the second framework, and is configured to move along an axial direction of the rotational shaft toward a side of the rotor core to contact the second support base and fix the rotor.

According to another embodiment, a motor has a cylindrical stator core. A first framework is fixed to the first side of the stator core in an axial direction. A first bearing housing, which holds a bearing, is fixed to the outside of the first framework. A second framework, which holds a bearing, is fixed to the second side of the stator core in an axial direction. The motor also has a rotor that includes a rotational shaft that is rotatably supported by the bearings. The rotational shaft extends into the first and second frameworks. A rotor core is attached to the rotational shaft, and faces an inner side of the stator core. A first support base and a second support base are fixed to the rotor, and are interposed by the rotor core. A first locking member that is movably coupled to the first framework is configured to move along an axial direction of the rotational shaft toward a side of the rotor core to contact the first support base and fix the rotor. A second locking member that is movably coupled to the second framework is configured to move along the axial direction of the rotational shaft toward a side of the rotor core to contact the second support base and fix the rotor. A first partition plate is fixed to the rotor between the rotor core and a first bearing portion. A second partition plate is fixed to the rotor between the rotor core and a second bearing portion.

According to another embodiment, a method of maintaining a motor is disclosed. A fixing bolt is removed from a first framework. A pushing bolt is screwed into the first framework, and the first locking member moves along a rotor into contact with a first support base of the rotor. A fixing bolt is removed from a second framework. A pushing bolt is screwed into the second framework, and the second locking member moves along the rotor into contact with a second support base of the rotor. The contact between the first locking member and the first support base and the contact between the second locking member and the second support base fixes the rotor.

The features and advantages of the present disclosure will be readily apparent to those skilled in the art upon a reading of the description of exemplary embodiments, which follows.

DETAILED DESCRIPTION

Figure 1:
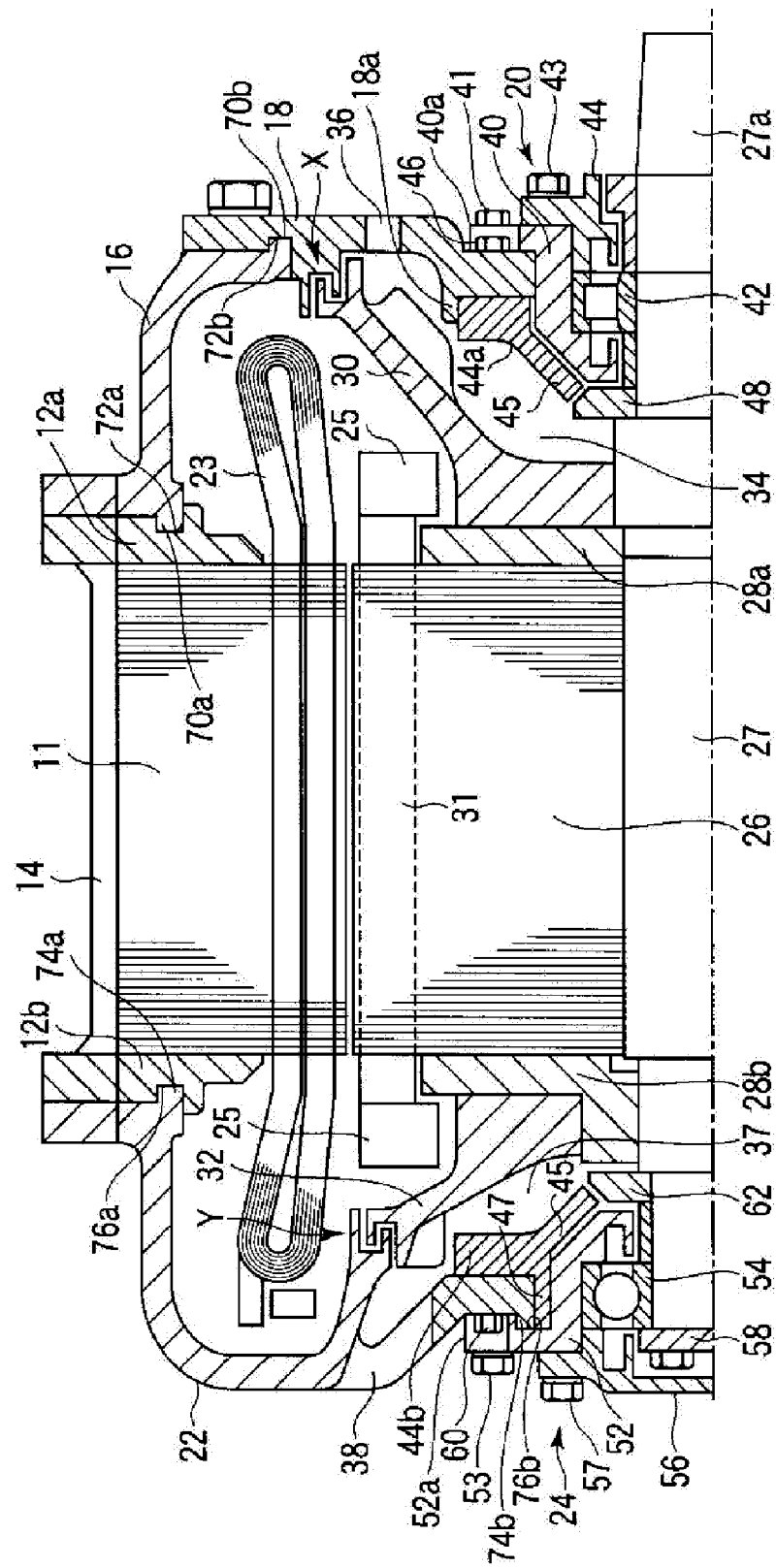
FIG. 1 is a cross sectional view illustrating a motor according to the first embodiment.

In general, according to one embodiment, a motor has a cylindrical stator core. A first framework is fixed to the first side of the stator core in an axial direction. A first bearing housing, which holds a bearing, is fixed to the outside of the first framework. A second framework is fixed to the other side of the stator core in the axial direction. A second bearing housing, which also holds a bearing, is fixed to the outside of the second framework. The motor also includes a rotor. The rotor has a rotational shaft rotatably supported by the bearings. The rotational shaft extends into the first and second frameworks of the motor. A rotor core is attached to the rotational shaft. The rotor core faces an inner side of the stator core. A first support base and a second support base are fixed to the rotor, and are interposed on the rotational shaft by the rotor core. A first locking member is movably coupled to the first framework. The first locking member is configured to move along an axial direction of the rotational shaft toward to contact the first support base. A second locking member is movably coupled to the second framework. The second locking member is configured to move along an axial direction of the rotational shaft toward the second support base. When the first locking member is in contact with the first support base and the second locking member is in contact with the second support base, the rotor is fixed.

Various embodiments will be hereinafter explained with reference to the drawings. Throughout the embodiments, the same structures are attached with the same reference numerals, and redundant explanations thereabout are not repeated. Each figure is a schematic view illustrating the embodiments for helping the understanding thereof. In each figure, some of shapes, sizes, ratios, and the like may be different from those in an actual apparatus. As necessary, these may be changed in design in view of the following explanation and known techniques.

FIG. 1 illustrates a totally-enclosed motor according to the first embodiment. This motor has a cylindrical stator core 11. A pair of ring-shaped core holders 12a, 12b are fixed to end faces of the stator core 11 in the axial direction. A plurality of connecting plates 14 are arranged on an outer periphery of the stator core 11. Each of these connecting plates 14 extends in the axial direction of the stator core 11, and both ends of the connecting plate 14 are fixed to the core holders 12a, 12b. The plurality of connecting plates 14 are arranged with an interval in the circumferential direction of the stator core 11.

A substantially cylindrical first bracket 16 made of aluminum alloy and the like is attached to the core holder 12a located at a side opposite to the driving end of the stator core 11. On a front end side of the first bracket 16, a ring-shaped bearing bracket 18 is fastened with bolts in a coaxial manner. In a central portion of the bearing bracket 18, a first bearing portion 20 including later-explained bearings is fastened with bolts. The first bracket 16 and the bearing bracket 18 constitute a first framework of the motor.

A substantially cup-shaped second bracket 22 made with aluminum alloy and the like is attached to the core holder 12b located at a side opposite to the driving end of the stator core 11. In a central portion of the second bracket 22, a second bearing portion 24 including later-explained bearings is fastened with bolts. The second bracket 22 constitutes a second framework of the motor.

Thus, a case (apparatus body), whose interior is enclosed, is constituted by the stator core 11, the core holder 12a, 12b, the first bracket 16, the bearing bracket 18, the second bracket 22, and the first and second bearing portions 20, 24.

In the motor, members except for the first bracket 16 and the second bracket 22 include various kinds of members, which are explained later. Most of them are made with steel. As mentioned above, the first bracket 16 and the second bracket 22 are made with a material other than the material of the other members. In other words, the first bracket 16 and the second bracket 22 are made with a material other than steel. In the present embodiment, in order to reduce the weight of the motor, the first bracket 16 and the second bracket 22 are made with a material lighter than steel or a material having a specific gravity less than steel, such as aluminum or aluminum alloy. The material is not limited to aluminum. The first bracket 16 and the second bracket 22 may be made of any material as long as the material is lighter than steel or has a specific gravity less than steel.

The stator core 11 is made by stacking many ring-shaped metal plates made of a magnetic material such as a silicon steel sheet. A plurality of slots each extending in the axial direction are formed on an inner peripheral portion of the stator core 11. A stator coil 23 is buried in these slots. Coil ends of the stator coil 23 protrude in the axial direction from both end faces of the stator core 11. The stator core 11 and the stator coil 23 constitute a stator (stationary part).

A cylindrical rotor core 26 is arranged inside of the stator core 11 in a coaxial manner with a gap formed between the cylindrical rotor core 26 and the stator core 11. A rotational shaft 27 is attached to a central portion of the rotor core 26 in a coaxial manner. Both ends of the rotational shaft 27 are rotationally supported by the first bearing portion 20 and the second bearing portion 24. Thus, the rotational shaft 27 extends in a coaxial manner in the case. The rotational shaft 27 and the rotor core 26 constitute a rotor (rotating part). A driving side end portion 27a of the rotational shaft 27 protrudes to the outside of the apparatus, and a joint for connecting a drive gear device is attached to this portion.

The rotor core 26 is made by stacking many ring-shaped metal plates made of a magnetic material such as a silicon steel sheet. The rotor core 26 is supported in such a manner that both side surfaces of the rotor core 26 in the axial direction are sandwiched by the pair of core holder 28a, 28b attached to the rotational shaft 27. The core holder 28a, 28b are formed in a ring shape, such that the outer diameter thereof is slightly smaller than the outer diameter of the rotor core 26.

A plurality of grooves each extending in the axial direction are formed on an outer peripheral portion of the rotor core 26. Rotor bars 31 are buried in respective grooves. Both end portions of the rotor bar 31 protrude from the rotor core 26, and the protruding portions thereof are integrally coupled with end rings 25. Thus, the squirrel cage rotor for the induction motor is formed. When the stator coil 23 is energized, the rotor core 26 rotates by induction, and the rotational shaft 27 rotates integrally with the rotor core 26.

Alternatively, a permanent magnet motor may be constituted by inserting a permanent magnet into the rotor core, instead of a squirrel cage rotor, in order to reduce the heat of the rotor and achieve a smaller motor.

A first partition plate 30 is attached to the rotational shaft 27 in a coaxial manner between the rotor core 26 and the first bearing portion 20 at the side of the driving end, and the first partition plate 30 can freely rotate integrally with the rotational shaft 27. The first partition plate 30 is formed in a substantially funnel shape, and the first partition plate 30 extends in an inclined manner from the rotor core 26 to the first bracket 16. An outer peripheral end portion of the first partition plate 30 has an engagement portion comprising an outer ring-shaped portion and an inner ring-shaped portion that defines a channel or groove therebetween. An inner peripheral portion of the protruding portion of the apparatus-side of the bearing bracket 18 has an engagement portion comprising an outer ring-shaped portion and an inner ring-shaped portion that defines a channel or groove therebetween. The two engagement portions are configured to engage with each other with a ring-shaped minute gap between them. This ring-shaped minute gap portion just described substantially forms a structure having two stages, i.e., a protrusion and a depression, thus forming a labyrinth structure portion X. As shown in figure, the outer ring-shaped portion of the first partition plate 30 engages the channel defined on the protruding portion of the apparatus-side of the bearing bracket 18. The inner ring-shaped portion of the bearing bracket 18 engages with the channel defined on the first partition plate 30. Further, a plurality of fins are formed on an outer surface of the first partition plate 30 to face the first bearing portion 20.

A second partition plate 32 is attached to the core holder 28b in a coaxial manner between the rotor core 26 and the second bearing portion 24 at the side opposite to the driving end, and the second partition plate 32 can freely rotate integrally with the rotational shaft 27. The second partition plate 32 is formed in a substantially funnel shape, and the second partition plate 32 extends in an inclined manner from the rotor core 26 to the second bracket 22. An outer peripheral end portion of the second partition plate 32 and an inner peripheral portion of a protruding portion of an apparatus-side of the second bracket 22 are engaged with each other with a ring-shaped minute gap formed therebetween. This ring-shaped minute gap portion is substantially formed in a structure having two stages, i.e., a protrusion and a depression, thus forming a labyrinth structure portion Y. A plurality of fins are formed on an outer surface of the second partition plate 32 to face the second bearing portion 24.

The first partition plate 30 and the second partition plate 32 separate, in an airtight manner, between the outside of the apparatus and the space inside of the apparatus in which the stator core 11 and the rotor core 26 are located. In addition, the first partition plate 30 and the second partition plate 32 radiate heat generated by the rotor.

The first bearing portion 20 is arranged outside of the first partition plate 30 with a space 34 formed between the first bearing portion 20 and the first partition plate 30. This space 34 forms an insulation structure which protects the first bearing portion 20 from being affected by the heat generated by the stator coil 23 and the rotor. Outside-air intake holes, not shown, in communication with the space 34 are formed in the bearing bracket 18, a later-explained first bearing housing 40, and the like so as to introduce outside air into this space 34. A plurality of discharge holes 36 in communication with the space 34 are formed in the bearing bracket 18. When the first partition plate 30 rotates, outside air is introduced into the space 34 through the outside-air intake holes. After the outside air cools the space 34, the outside air is discharged from the discharge holes 36. Therefore, the outside-air intake holes contribute to cooling of the first bearing portion 20 and the rotor.

The second bearing portion 24 is arranged outside of the second partition plate 32 with a space 37 formed between the second bearing portion 24 and the second partition plate 32. This space 37 forms an insulation structure which protects the second bearing portion 24 from being affected by the heat generated by the stator coil 23 and the rotor. Outside-air intake holes, not shown, in communication with the space 37 are formed in the second bracket 22, a later-explained second bearing housing 52, and the like so as to introduce outside air into this space 37. A plurality of discharge holes 38 in communication with the space 37 are formed in the second bracket 22. When the second partition plate 32 rotates, outside air is introduced into the space 34 through the outside-air intake holes. After the outside air cools the space 37, the outside air is discharged from the discharge holes 38. Therefore, the outside-air intake holes contribute to cooling of the second bearing portion 24 and the rotor.

Subsequently, the first bearing portion 20 and the second bearing portion 24 are explained in detail.

In the first bearing portion 20, an opening is formed in a central portion of the bearing bracket 18, and the first bearing housing 40 is inserted into this opening from the outside and is engaged therewith. A flange portion 40a of the first bearing housing 40 is fixed to an outer surface of the bearing bracket 18 with a plurality of bolts 41 inserted from the outside. Thus, the first bearing housing 40 is fixed to the bracket 18. The first bearing housing 40 includes the roller bearings 42 therein. The inner race of the roller bearings 42 is engaged with the rotational shaft 27. An end cap 44 is fixed to the outside of the first bearing housing 40 with bolts 43 so as to cover the opening of the first bearing housing 40. Oil lubrication grease is filled around the roller bearings 42 in the first bearing housing 40.

Figure 2:
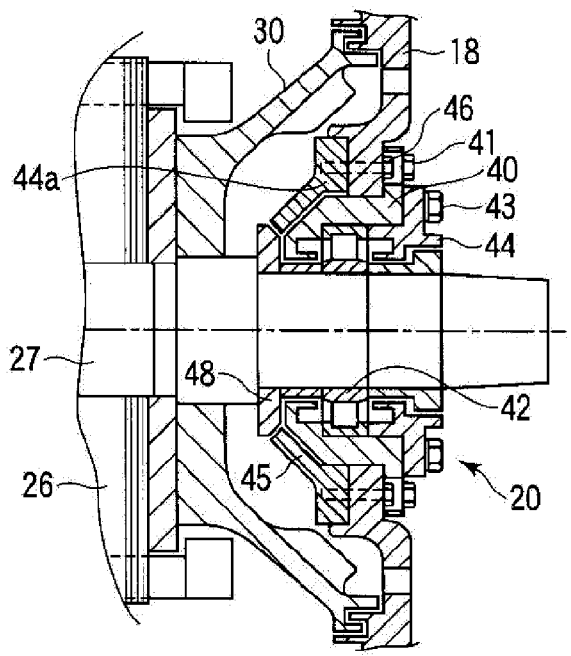
FIG. 2 is an enlarged cross sectional view illustrating a first bearing portion of the motor and portions therearound.

As shown in FIG. 1 and FIG. 2, a ring-shaped first locking member 44a is arranged on an outer peripheral side of the first bearing housing 40, and is located on the inner surface side of the bearing bracket 18. The outer periphery of the first locking member 44a is slidably engaged with a ring-shaped protruding portion 18a arranged on the inner surface side of the bearing bracket 18 in protruding manner. The first locking member 44a is slidable on the bearing bracket 18 along the axial direction of the rotational shaft 27. The first locking member 44a integrally has a funnel-shaped contact portion 45 extending toward the rotational shaft 27. During normal operation of the motor, the first locking member 44a is fixed at a fixing position as shown in the figure, i.e., a position at which the first locking member 44a is in contact with the inner surface of the bearing bracket 18, with a plurality of fixing bolts 46 screwed from the outside of the bearing bracket 18. The plurality of fixing bolts 46 are arranged with a predetermined interval in a circumferential direction of a circle concentric with the rotational shaft 27. The fixing bolts 46 are respectively arranged at positions symmetrical with respect to the rotational shaft 27. Each of the fixing bolts 46 is inserted from the outside through a penetrating hole formed in the bearing bracket 18, and is screwed into a screw hole formed in the first locking member 44a.

A ring-shaped support base 48 is coaxially fixed to the rotational shaft 27 in proximity to the first bearing housing 40. The outer periphery of the support base 48 has a tapered surface. This tapered surface is formed continuously on the entire circumference, and is located concentrically with the rotational shaft 27. This tapered surface faces the contact portion 45 of the first locking member 44a with a minute gap formed between the tapered surface and the contact portion 45.

As shown in FIG. 1, an opening is formed in a central portion of the second bracket 22 in the second bearing portion 24, and the second bearing housing 52 is inserted into this opening from the outside and is engaged therewith. The flange portion 52a of the second bearing housing 52 is fixed with the outer surface of the second bracket 22 with a plurality of bolts 53 inserted from the outside. Thus, the second bearing housing 52 is fixed to the second bracket 22. The second bearing housing 52 includes ball bearings 54 therein. The inner race of the ball bearings 54 is engaged with the rotational shaft 27. An end cap 56 is fixed to the outside of the second bearing housing 52 with bolts 57 so as to cover the opening of the second bearing housing 52. Oil lubrication grease is filled around the ball bearings 54 in the second bearing housing 52. Further, an end plate 58 is fixed with bolts to the end of the non-output side of the rotational shaft 27. This end plate 58 restricts the ball bearings 54 so that the ball bearings 54 do not come off.

A ring-shaped second locking member 44b is arranged and engaged on an outer periphery of the second bearing housing 52, and is located on the inner surface side of the second bracket 22. The outer periphery of the second locking member 44b is slidably engaged with the inner peripheral surface of the opening formed in the center of the second bracket 22, and the inner periphery of the second locking member 44b is slidably engaged with the outer peripheral surface of the second bearing housing 52. The second locking member 44b is slidable on the second bearing housing 52 along the axial direction of the rotational shaft 27. The second locking member 44b integrally has a funnel-shaped contact portion 45 extending toward the rotational shaft 27. During normal operation of the motor, the second locking member 44b is fixed at a fixing position as shown in the figure, i.e., a position at which the second locking member 44b is in contact with the inner surface of the second bracket 22, with a plurality of fixing bolts 60 screwed from the outside of the second bracket 22. The plurality of fixing bolts 60 are arranged with a predetermined interval in a circumferential direction of a circle concentric with the rotational shaft 27. The fixing bolts 60 are respectively arranged at positions symmetrical with respect to the rotational shaft 27. Each of the fixing bolts 60 is inserted from the outside through a penetrating hole formed in the second bracket 22, and is screwed into a screw hole formed in the second locking member 44b.

A ring-shaped support base 62 is coaxially fixed to the rotational shaft 27 in proximity to the second bearing housing 52. The outer periphery of the support base 62 has a tapered surface. This tapered surface is formed continuously on the entire circumference, and is located concentrically with the rotational shaft 27. This tapered surface faces the contact portion 45 of the second locking member 44b with a minute gap formed between the tapered surface and the contact portion 45.

According to the totally-enclosed motor having the above structure, heat generated by the stator coil 23 is discharged to outside air by way of the outer peripheral surface of the stator core 11 and the first and second brackets 16, 22. On the other hand, heat generated by the rotor is discharged by way of the first and second partition plates 30, 32. The first and second bearing portions 20, 24 are separated from the stator coil 23 and the like, i.e., a source of heat, by the spaces 34, 37 defined by the first and second partition plates 30, 32, and are cooled by outside air introduced into these spaces. Therefore, the motor is less affected by heat, and can achieve the totally-enclosed structure. It is not necessary to introduce outside air into the totally-enclosed motor, which has been improved as described above. Accordingly, it is not necessary to clean a filter and the inside of the motor. As a result, the labor of maintenance can be drastically saved.

Due to the structure of the bearing portion as described above, the bearing portion can be disassembled, cleaned, and maintained without pulling the rotor out of the stator. In other words, when the fixing bolts 46, 60 for fixing the first and second locking members 44a, 44b are removed, and a plurality of pushing bolts are screwed in place of the fixing bolts 46, 60, the first and second locking members 44a, 44b move to a central side along the central shaft of the motor, and come into abutment with the tapered surface of the support bases 48, 62 attached to the rotational shaft 27, thus fixing and holding the rotor to the stator.

This locking mechanism will be explained in detail. As shown in FIG. 1 and FIG. 2, during normal operation of the motor, the first and second locking members 44a, 44b are pulled by the fixing bolts 46, 60 to the bearing bracket 18 and the second bracket 22, and are away from the support bases 48, 62. In this arrangement, the rotor can rotate.

Figure 3:
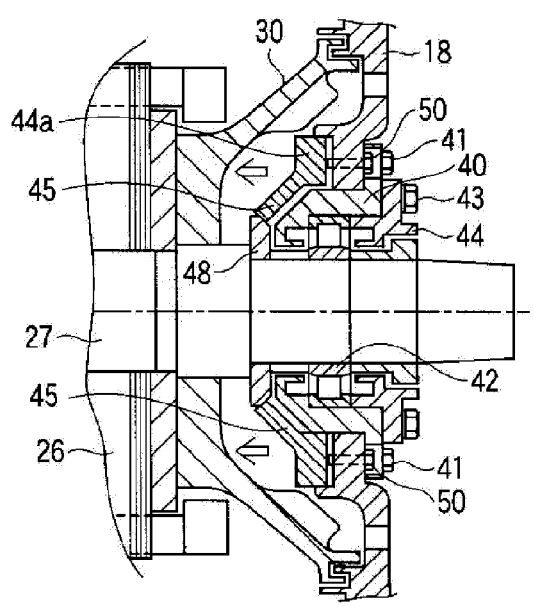
FIG. 3 is a cross sectional view of the motor illustrating the first bearing portion when a rotor is locked by a locking member.

On the other hand, for example, during maintenance and inspection, the fixing bolts 46 are removed, and instead of the fixing bolts 46, the pushing bolts 50 are screwed as shown in FIG. 3. Accordingly, the first locking member 44a moves to the central side along the central shaft of the motor, and the contact portion 45 comes into abutment with the tapered surface of the support base 48. On the other hand, the second locking member 44b is also pushed to the central side of the motor by the pushing bolts, whereby the contact portion 45 comes into abutment with the tapered surface of the support base 62. As a result, the rotor is pushed by the first locking member 44a and the second locking member 44b in directions opposite to each other, and the rotor is fixed and held with respect to the stator. In other words, the rotor is fixed to the framework while the rotor is held coaxially with the stator core 11 and with a predetermined gap therebetween.

Figure 4:
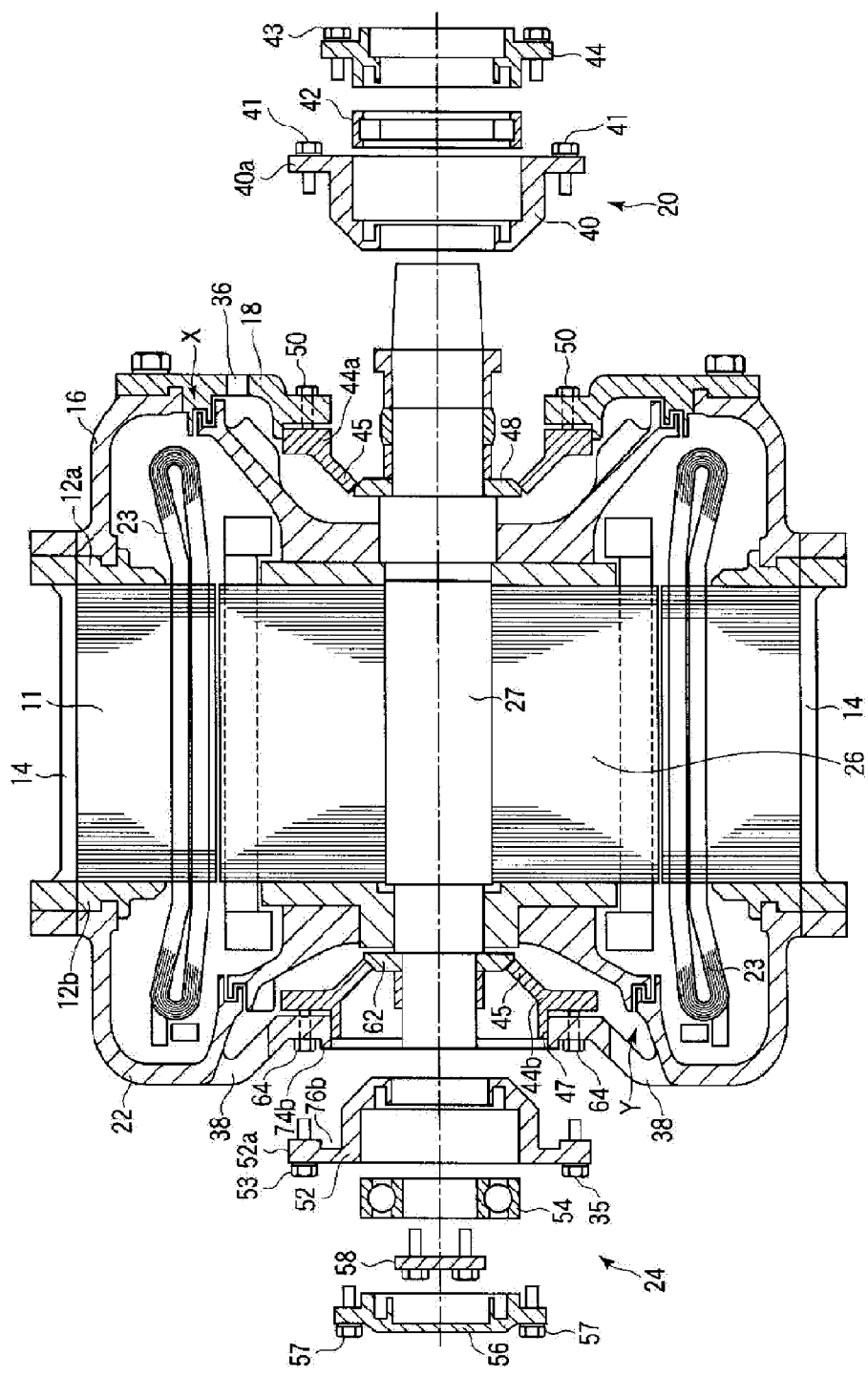
FIG. 4 is a cross sectional view of the motor illustrating the first bearing portion and the second bearing portion of the motor when the first bearing portion and the second bearing portion are disassembled.

Since the rotor is fixed in this manner, the first and second bearing portions 20, 24 can be, e.g., disassembled, inspected, and refilled with grease without pulling the rotor out of the stator. In other words, as shown in FIG. 4, the first bearing portion 20 and the second bearing portion 24 can be disassembled at the bearing housing portion and detached from the rotor and the framework while the rotor is fixed to the stator.

For example, the first bearing portion 20 is disassembled as follows. The bolts 41 are removed, and thereafter, the first bearing housing 40 is pulled out from the bearing bracket 18 to the outside. Further, the bolts 43 are removed, and thereafter, the end cap 44 is removed from the first bearing housing 40. The oil lubrication grease in the outer race of the bearings attached to the inner periphery of the first bearing housing 40 is replaced with new oil lubrication grease.

On the other hand, the second bearing portion 24 is disassembled as follows. The bolts 57 are removed, and thereafter, the end cap 56 is removed from the second bearing housing 52. Further, the bolts are removed, and the end plate 58 is removed from the end of the rotational shaft 27. Subsequently, the bolts 53 are removed, and thereafter, the second bearing housing 52 is pulled out from the second bracket 22 to the outside, and the oil lubrication grease in the outer race of the bearings attached to the inner periphery of the second bearing housing 52 is replaced with new oil lubrication grease. At this occasion, the entire rotor including the rotational shaft 27 is fixed and held by the first and second locking members 44a, 44b. Therefore, even when the first bearing housing 40 and the second bearing housing 52 are pulled out, the entire rotor is held at a predetermined position with respect to the stator.

After the bearing grease is replaced, the first bearing housing 40 and the second bearing housing 52 are attached to the bearing bracket 18 and the second bracket 22, and are fixed to the brackets with the bolts 41, 53. Subsequently, the end cap 44, the end plate 58, and the end cap 56 are respectively fixed with bolts. Thereafter, instead of the pushing bolts 50, the fixing bolts 46 are inserted into the first locking member 44a from the outside and are screwed therein, whereby the first locking member 44a is brought back to the initial position in which the first locking member 44a is away from the support base 48. Likewise, instead of the pushing bolts 64, the fixing bolts 60 are inserted into the second locking member 44b from the outside and are screwed therein, whereby the second locking member 44b is brought back to the initial position in which the second locking member 44b is away from the support base 62. As a result, the fixing of the rotor is released to allow the rotor to freely rotate. With the above operation, the replacement of the oil lubrication grease is completed.

The mechanism as described above allows replacing and maintenance of the bearings and the grease in the bearing portions without pulling the rotor out of the stator. In particular, a rotor structure including a permanent magnet has a permanent magnet having strong magnetic force in a rotor core, and when a rotor is pulled out, the rotor core is attracted by a stator core of a stator. Therefore, the rotor having the permanent magnet has a problem in that it is very difficult to pull the rotor out of the stator. However, this kind of problem can be solved by the above structure.

As shown in FIG. 1, the frame for the motor is eliminated, and the stator core 11 is partially fixed by the connecting plates 14. The first bracket 16 and the second bracket 22 made of aluminum alloy extend in the axial direction from both ends of the stator core 11, such that the first bracket 16 and the second bracket 22 is structured as the framework extending to the bearing portion. According to this structure, a portion of the steel frame is replaced with aluminum, which greatly reduces the weight. The engaging portions between the first and second brackets 16, 22 and the steel material are structured as a double engagement structure, which prevents displacement and gap at the engaging portions caused by the difference in the thermal expansion coefficients between steel and aluminum alloy. As a result, this prevents change in the center of the axis of the rotor, and enables the rotor to maintain smooth rotation.

More specifically, as shown in FIG. 1, the first bracket 16 integrally includes a ring-shaped first protruding portion 70a formed at an end of a side of the stator core 11 and a ring-shaped second protruding portion 70b formed at an end of a side of the bearing bracket. The first protruding portion 70a protrudes to the side of the stator core 11, and the second protruding portion 70b protrudes in the direction opposite to the first protruding portion, i.e., the second protruding portion 70b protrudes towards the outside of the case. The first protruding portion 70a and the second protruding portion 70b are formed coaxially with the rotational shaft 27. The core holder 12a is formed with a ring-shaped groove 72a. The inner surface side of the bearing bracket 18 is formed with a ring-shaped groove 72b. These ring-shaped grooves 72a, 72b are formed coaxially with the rotational shaft 27.

The first protruding portion 70a of the first bracket 16 is engaged with the ring-shaped groove 72a of the core holder 12a. The inner peripheral surface and the outer peripheral surface of the first protruding portion 70a are engaged doubly in such a manner that both sides of the first protruding portion 70a are sandwiched by the core holder 12a. Likewise, the second protruding portion 70b of the first bracket 16 is engaged with the ring-shaped groove 72b of the bearing bracket 18. The inner peripheral surface and the outer peripheral surface of the second protruding portion 70b are engaged doubly in such a manner that both sides of the second protruding portion 70b are sandwiched by the bearing bracket.

The second bracket 22 integrally includes a ring-shaped first protruding portion 74a formed at an end of a side of the stator core 11 and a ring-shaped second protruding portion 74b formed at an end of an opening at a side of the second bearing housing 52. The first protruding portion 74a protrudes to the side of the stator core 11, and the second protruding portion 74b protrudes in the direction opposite to the first protruding portion, i.e., the second protruding portion 74b protrudes to the outside of the case. The first protruding portion 74a and the second protruding portion 74b are formed coaxially with the rotational shaft 27. The core holder 12b is formed with a ring-shaped groove 76a. The inner surface of the flange 52a of the second bearing housing 52 is formed with a ring-shaped groove 76b. These ring-shaped grooves 76a, 76b are formed coaxially with the rotational shaft 27.

The first protruding portion 74a of the second bracket 22 is engaged with the ring-shaped groove 76a of the core holder 12b. The inner peripheral surface and the outer peripheral surface of the first protruding portion 74a are engaged doubly in such a manner that both sides of the first protruding portion 74a are sandwiched by the core holder 12b. Likewise, the second protruding portion 74b of the second bracket 22 is engaged with the ring-shaped groove 76b of the second bearing housing 52. The second locking member 44b has a ring-shaped protruding portion 47 protruding to the outside. This protruding portion 47 as well as the second protruding portion 74b of the second bracket 22 are engaged with the ring-shaped groove 76b of the second bearing housing 52. Thus, the outer peripheral surface of the second protruding portion 74b is engaged with the flange of the second bearing housing 52, and the inner peripheral surface is engaged with the protruding portion 47 of the second locking member 44b. With this engagement, the second protruding portion 74b is engaged doubly in such a manner that both sides, i.e., the inner periphery and the outer periphery, of the second protruding portion 74b are sandwiched. The outer peripheral surface of the protruding portion 47 of the second locking member 44b is engaged with the inner peripheral surface of the central opening of the second bracket 22 and the inner peripheral surface of the second protruding portion 74b, the inner peripheral surface of the protruding portion 47 of the second locking member 44b is engaged with the outer periphery of the second bearing housing 52. With this engagement, the second locking member 44b is positioned, and is further supported slidably in the axial direction.

As described above, the engaging portion between the first and second brackets 16, 22 and the steel material is made as a double engagement structure, which prevents displacement and gap occurring at the engaging portion caused by the difference in the thermal expansion coefficients between steel and aluminum alloy. As a result, this reduces displacement of the first and second brackets. Therefore, the weight of the motor can be reduced by using the framework made with aluminum alloy and the like. Even in the motor having the double engagement structure, the total enclosure feature of the totally-enclosed motor can be maintained without deviating from the function of the double engagement, and the bearing portion alone can be easily detached, disassembled, and maintained without disassembling the entire motor.

Figure 5:
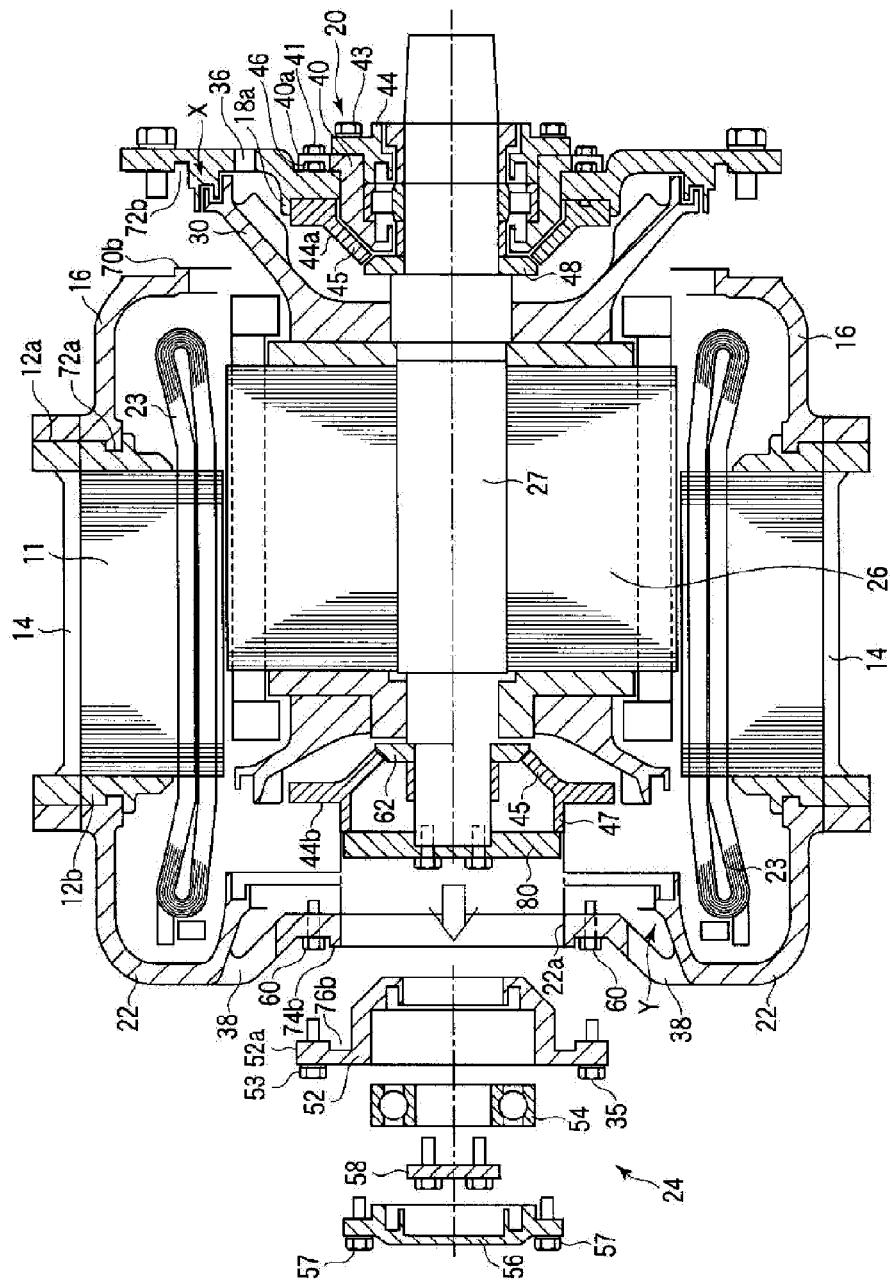
FIG. 5 is a cross sectional view of the motor illustrating an assembly step of the motor.

Assembly of the entire motor having the above structure will be explained. In other words, a case will be explained where the rotor is attached by inserting the rotor into the case. As shown in FIG. 5, first, the case is structured by fixing the core holders 12a, 12b, the first bracket 16, and the second bracket 22 to the stator core 11. Further, the core holder, the first partition plate 30, the support base 48, the first locking member 44a, the first bearing housing 40, and the bearing bracket 18 are assembled to an axial end portion at the driving side of the rotor. Then, the core holder, the second partition plate 32, the support base 62, and the second locking member 44b are assembled to an axial end portion of the rotor at the side opposite to the driving side. Further, a disk-shaped assembly jig 80 is attached with a screw in a concentrical manner to a shaft end at the driving side, and the second locking member 44b is fixed and held on the rotor by this assembly jig 80. The assembly jig 80 can come into contact with the protruding portion 47 of the second locking member 44a, and the assembly jig 80 is formed to have such an outer diameter that the assembly jig 80 can be inserted into a central opening 22a of the second bracket 22.

Subsequently, the rotor is positioned at a predetermined position by inserting the rotor through the central opening of the first bracket 16 into the case and the stator core 11. Then, the bearing bracket 18 is fixed to the first bracket 16 with the bolts so as to support the shaft portion of the rotor at the driving side. Further, the protruding portion 47 of the second locking member 44b assembled to the shaft end of the rotor at the side opposite to the driving side is engaged with the central opening 22a of the second bracket 22, and is fixed to the second bracket with the fixing bolt 60. Thus, the shaft portion of the rotor at the side opposite to the driving side is supported by the second bracket 22. At this occasion, the assembly jig 80 is inserted into the central opening 22a of the second bracket 22, and can be detached from the outside of the second bracket.

Subsequently, the assembly jig 80 is detached from the shaft end of the rotor, and thereafter, the ball bearing 54, the second bearing housing 52, the end plate 58, and the end cap 56 are successively attached from the outside, and are fixed with the bolts. Thus, the assembly is completed.

The second protruding portion 74b of the second bracket 22 is formed so that the second protruding portion 74b does not interfere with the assembly jig 80 during assembly in order to enable the assembly of the motor as described above. In other words, the second protruding portion 74b is formed outside of the central opening 22a of the second bracket 22, and is formed to protrude to the outside in the axial direction of the case from the second bracket. Therefore, the second protruding portion 74b does not protrude to the central opening 22a of the second bracket 22. Further, the second protruding portion 74b allows the assembly jig 80 to be inserted into the central opening 22a of the second bracket 22, and allows the assembly jig 80 to be detached from the outside of the case.

A motor according to another embodiment will be explained. In the following embodiment, the same portions as the above first embodiment are denoted with the same reference numerals, and the detailed explanations thereabout are not repeated here.

Figure 6:
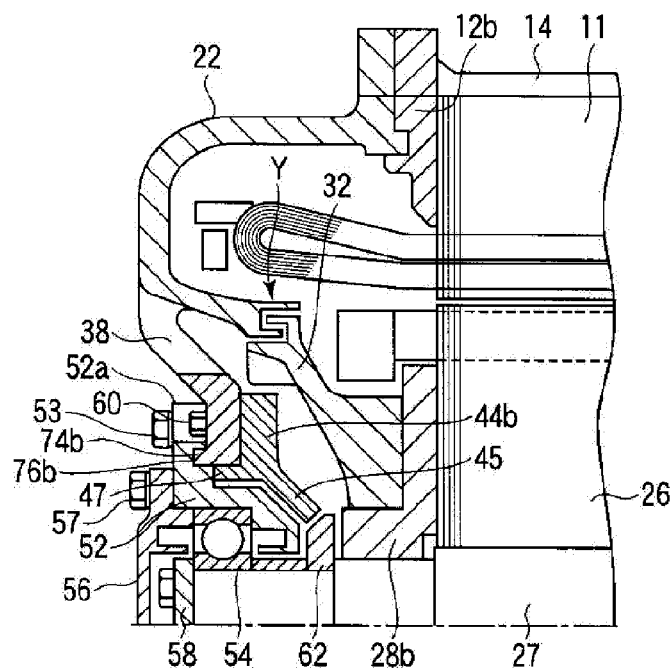
FIG. 6 is a cross sectional view illustrating a portion of a motor according to the second embodiment.

FIG. 6 illustrates a portion of a totally-enclosed motor according to the second embodiment. The second embodiment is different from the first embodiment in that the second embodiment has a different engagement structure of a second protruding portion 74b of a second bracket 22 and a different engagement structure of a second locking member 44b.

The second bracket 22 formed with aluminum alloy and the like integrally includes a ring-shaped second protruding portion 74b formed at an end of an opening at a side of the second bearing housing. The second protruding portion 74b protrudes to the outside of the case. The second protruding portion 74b is formed coaxially with the rotational shaft 27. The inner surface of a flange 52a of a second bearing housing 52 is formed with a ring-shaped groove 76b. The ring-shaped groove 76b is formed coaxially with the rotational shaft 27.

The second protruding portion 74b of the second bracket 22 is engaged with the ring-shaped groove 76b of the second bearing housing 52. The inner peripheral surface and the outer peripheral surface of the second protruding portion 74b are engaged doubly in such a manner that both sides are sandwiched by the second bearing housing.

The second locking member 44b has a ring-shaped protruding portion 47 protruding to the outside. The outer peripheral surface of the protruding portion 47 is engaged with the inner peripheral surface of the central opening of the second bracket 22. Thus, the second locking member 44b is positioned, and the second locking member 44b is supported slidably along the axial direction of the rotational shaft 27 by the outer peripheral surface of the protruding portion 47 serving as a guide.

Figure 7:
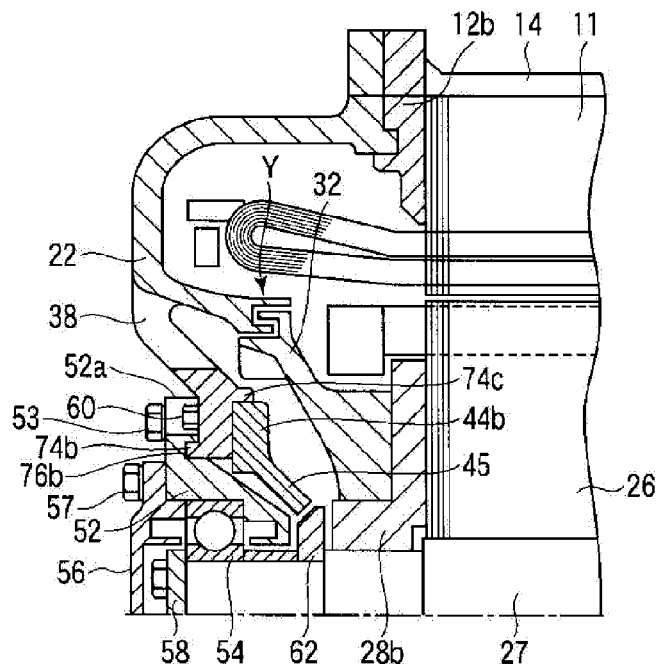
FIG. 7 is a cross sectional view illustrating a portion of a motor according to the third embodiment.

FIG. 7 illustrates a portion of a totally-enclosed motor according to the third embodiment. The third embodiment is different from the first embodiment in that the third embodiment has a different engagement structure of a second protruding portion 74b of a second bracket 22 and a different engagement structure of a second locking member 44b.

The second bracket 22 formed with aluminum alloy and the like integrally includes a ring-shaped second protruding portion 74b formed at an end of an opening at a side of the second bearing housing and a ring-shaped third protruding portion 74c formed at an outer peripheral side with respect to the opening end. The second protruding portion 74b protrudes to the outside of the case. The third protruding portion 74c protrudes from the inner surface of the second bracket 22 to the side of the rotor core 26. The second protruding portion 74b and the third protruding portion 74c are formed coaxially with the rotational shaft 27. The inner surface of a flange 52a of a second bearing housing 52 is formed with a ring-shaped groove 76b. The ring-shaped groove 76b is formed coaxially with the rotational shaft 27.

The second protruding portion 74b of the second bracket 22 is engaged with the ring-shaped groove 76b of the second bearing housing 52. The inner peripheral surface and the outer peripheral surface of the second protruding portion 74b are engaged doubly in such a manner that both sides are sandwiched by the second bearing housing.

The second locking member 44b is fixed by being in contact with the inner surface of the second bracket 22, and the outer peripheral surface of the second locking member 44b is engaged with the inner peripheral surface of the third protruding portion 74c. Thus, the second locking member 44b is positioned, and the second locking member 44b is supported slidably along the axial direction of the rotational shaft 27 by the inner peripheral surface of the third protruding portion 74c serving as a guide.

Figure 8:
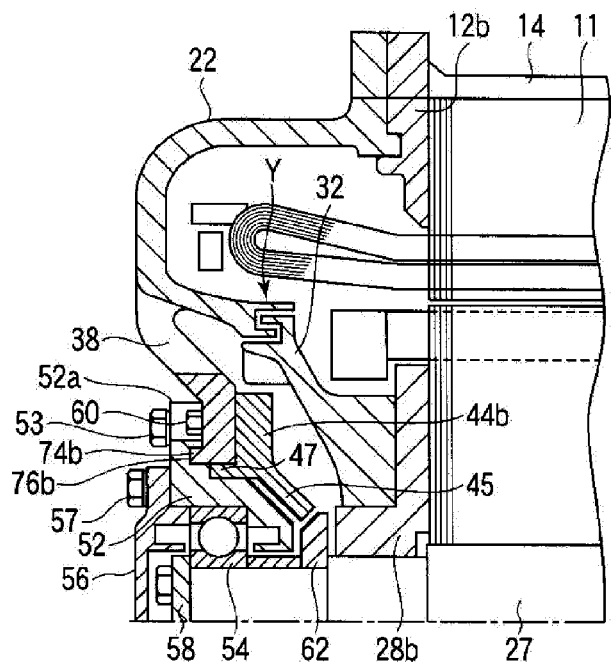
FIG. 8 is a cross sectional view illustrating a portion of a motor according to the fourth embodiment.

FIG. 8 illustrates a portion of a totally-enclosed motor according to the fourth embodiment. The fourth embodiment is different from the first embodiment in that the fourth embodiment has a different engagement structure of a second protruding portion 74b of a second bracket 22 and a different engagement structure of a second locking member 44b.

The second bracket 22 formed with aluminum alloy and the like integrally includes a ring-shaped second protruding portion 74b formed at an end of an opening at a side of the second bearing housing. The second protruding portion 74b protrudes to the outside of the case. The second protruding portion 74b is formed coaxially with the rotational shaft 27. The inner surface of a flange 52a of a second bearing housing 52 is formed with a ring-shaped groove 76b. The ring-shaped groove 76b is formed coaxially with the rotational shaft 27.

The second protruding portion 74b of the second bracket 22 is engaged with the ring-shaped groove 76b of the second bearing housing 52. The inner peripheral surface and the outer peripheral surface of the second protruding portion 74b are engaged doubly in such a manner that both sides are sandwiched by the second bearing housing.

The second locking member 44b has a ring-shaped protruding portion 47 protruding to the outside. The second locking member 44b is in contact with the inner surface of the second bracket 22. The outer peripheral surface of the protruding portion 47 is engaged with the inner peripheral surface of the central opening of the second bracket 22, and the inner peripheral surface of the protruding portion 47 is engaged with the outer peripheral surface of the second bearing housing 52. Thus, the second locking member 44b is positioned, and the second locking member 44b is supported slidably along the axial direction of the rotational shaft 27 by the second bracket 22 and the second bearing housing 52 serving as a guide.

Figure 9:
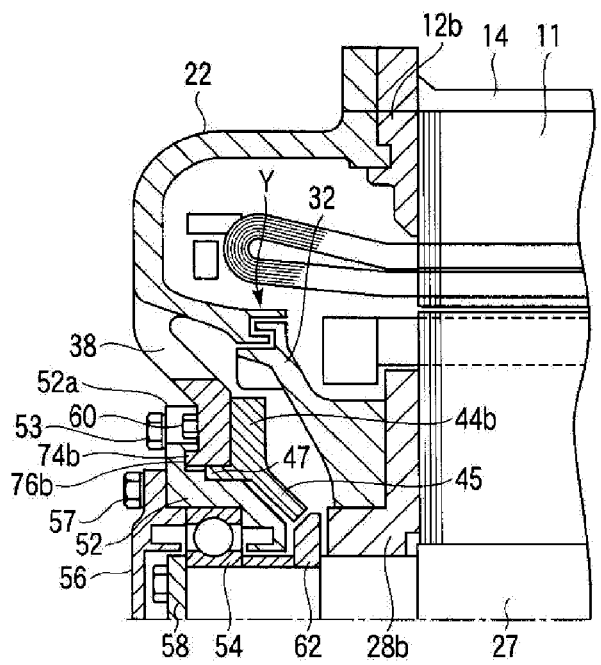
FIG. 9 is a cross sectional view illustrating a portion of a motor according to the fifth embodiment.

FIG. 9 illustrates a portion of a totally-enclosed motor according to the fifth embodiment. The fifth embodiment is different from the first embodiment in that the fifth embodiment has a different engagement structure of a second protruding portion 74b of a second bracket 22 and a different engagement structure of a second locking member 44b.

The second bracket 22 formed with aluminum alloy and the like integrally includes a ring-shaped second protruding portion 74b formed at an end of an opening at a side of the second bearing housing. The second protruding portion 74b protrudes to the outside of the case. The second protruding portion 74b is formed coaxially with the rotational shaft 27. The inner surface of a flange 52a of a second bearing housing 52 is formed with a ring-shaped groove 76b. The ring-shaped groove 76b is formed coaxially with the rotational shaft 27. The second protruding portion 74b of the second bracket 22 is engaged with the ring-shaped groove 76b of the second bearing housing 52, and the outer peripheral surface of the second protruding portion 74b is in contact with the second bearing housing.

The second locking member 44b has a ring-shaped protruding portion 47 protruding to the outside. The second locking member 44b is in contact with the inner surface of the second bracket 22. The outer peripheral surface of the protruding portion 47 is engaged with the inner peripheral surface of the central opening of the second bracket 22, and the inner peripheral surface of the protruding portion 47 is engaged with the outer peripheral surface of the second bearing housing 52. Thus, the second locking member 44b is positioned, and the second locking member 44b is supported slidably along the axial direction of the rotational shaft 27 by the second bracket 22 and the second bearing housing 52 serving as a guide.

The outer peripheral surface of the second protruding portion 74b of the second bracket 22 is engaged with the second bearing housing 52, and the inner peripheral surface of the central opening of the second bracket 22 is engaged with the outer peripheral surface of the protruding portion 47 of the second locking member 44b. Therefore, the second bracket 22 is engaged doubly in such a manner that both sides of the second bracket 22 are sandwiched.

In the second to fifth embodiments having the above structures, the same actions and effects as those of the first embodiment can also be obtained, and the light weight motors can be provided in which maintenance operation can be easily carried out.

It should be noted that this invention is not strictly limited to the above embodiments, and when the invention is embodied, constituent elements may be changed without deviating from the gist of the invention. Various embodiments of the invention can be formed by combining some of the elements disclosed herein. For example, several elements may be removed or replaced with different structures from those elements shown in the embodiments. Further, elements from different embodiments may be appropriately combined.

For example, in the above embodiments, the first and second bearing portions are made by a combination of roller bearings and ball bearings. However, this invention is not limited thereto. The first and second bearing portions may be made with a combination of flanged roller bearings and roller bearings. The motor may be an induction motor or a permanent magnet synchronous motor. The first and second partition plates respectively include fins to serve as fans. Alternatively, the first and second partition plates may not have any fins. A position at which the support base receiving the locking member is arranged is not limited to the rotational shaft. The support base may be arranged on the core holder or the partition plate.

Both of the space defined between the first partition plate and the first bearing housing and the space defined between the second partition plate and the second bearing housing are configured to be in communication with outside air. However, the structure is not limited thereto. For example, outside air may blow from one of the spaces to the other of the spaces via the rotor. Alternatively, outside air may not blow in either of the spaces.

The pushing bolts for pushing the locking members are screwed in place of the fixing bolts for fixing the locking members. Alternatively, the motor may have a structure in which not only the fixing bolts but also the pushing bolts are attached at a time. For example, the bracket constituting the framework may be arranged with penetrating holes into which the fixing bolts are inserted and screw holes into which the pushing bolts are screwed. In this case, a plurality of penetrating holes for the fixing bolts and a plurality of screw holes for the pushing bolts are formed with a predetermined interval in the circumferential direction in a concentric manner with the rotational shaft. The fixing bolts are inserted into the penetrating holes of the bracket, and are screwed into the screw holes formed in the locking member. The pushing bolts are screwed into the screw holes of the bracket, and the ends of the bolts come into contact with the end face of the locking member, thereby pushing the locking member to a locking position side.

The tapered surface of the support base, which is in contact with the locking member, may not continuously extend over the entire periphery. Alternatively, the tapered surface may be formed intermittently in the circumferential direction. On the other hand, a portion of the support base in contact with the locking member may not be the surface, and may be a point, a straight line, or a curved line.

What is claimed is:

1. A motor comprising:
   a cylindrical stator core;
   a first framework fixed to the first side of the stator core in an axial direction;
   a first bearing housing fixed to the outside of the first framework, wherein the first bearing housing holds a bearing;
   a second framework fixed to the second side of the stator core in the axial direction;
   a second bearing housing fixed to the outside of the second framework, wherein the second bearing housing holds a bearing;
   a rotor comprising:
     a rotational shaft rotatably supported by the bearings, wherein the rotational shaft extends into the first and second frameworks;

a rotor core attached to the rotational shaft, wherein the rotor core faces an inner side of the stator core; and
a first support base and a second support base fixed to the rotor, wherein the first support base and the second support base are interposed by the rotor core;
a first locking member movably coupled to the first framework, wherein the first locking member is configured to move along the axial direction of the rotational shaft toward a side of the rotor core to contact the first support base and fix the rotor; and
a second locking member movably coupled to the second framework, wherein the second locking member is configured to move along the axial direction of the rotational shaft toward a side of the rotor core to contact the second support base and fix the rotor.

2. The motor of claim 1, wherein:
the second framework further comprises an outward ring-shaped first protrusion at an inner opening of the second framework at a side of the second bearing housing;
the second bearing housing further comprises a flange formed with a ring-shaped groove;
the second framework is configured to engage the first protrusion with the groove;
the second locking member further comprises an outward ring-shaped second protrusion; and
the second locking member is configured to engage an outer peripheral surface of the outward ring-shaped protrusion with an inner peripheral surface of the second framework.

3. The motor of claim 1, wherein:
the second framework further comprises an outward ring-shaped first protrusion and an inward ring-shaped second protrusion;
the second bearing housing further comprises a flange integrally formed with a ring-shaped groove;
the second framework is configured to engage the first protrusion with the groove; and
the second locking member is configured to engage an outer peripheral surface of the second locking member with an inner peripheral surface of the second protrusion.

4. The motor of claim 1, wherein:
the second framework further comprises an outward ring-shaped first protrusion formed at an end of an opening at a side of the second bearing housing;
the second bearing housing further comprises a flange formed with a ring-shaped groove;
the second framework is configured to engage the first protrusion with the groove;
the second locking member further comprises an outward ring-shaped second protrusion;
the second locking member is configured to contact an inner surface of the second framework, engage an outer peripheral surface of the second protrusion with an inner peripheral surface of the opening at the side of the second bearing housing, and engage an inner peripheral surface of the second protrusion with an outer peripheral surface of the second bearing housing.

5. The motor of claim 1, wherein:
the second framework further comprises an outward ring-shaped first protrusion formed at an end of an opening at a side of the second bearing housing;
the second bearing housing further comprises a flange formed with a ring-shaped groove;
the second framework is configured to engage the first protrusion with the groove and contact an outer peripheral surface of the first protrusion with the second bearing housing;
the second locking member further comprises an outward ring-shaped second protrusion; and
the second locking member is configured to engage an outer peripheral surface of the second protrusion with an inner peripheral surface the opening of the second framework at the side of the second bearing housing, and engage an inner peripheral surface of the second protrusion with an outer peripheral surface of the second bearing housing.

6. A motor comprising:
a cylindrical stator core;
a first framework fixed to the first side of the stator core in an axial direction;
a first bearing housing fixed to the outside of the first framework, wherein the first bearing housing holds a bearing;
a second framework fixed to the second side of the stator core in the axial direction;
a second bearing housing fixed to the outside of the second framework, wherein the second bearing housing holds a bearing;
a rotor comprising:
a rotational shaft rotatably supported by the bearings, wherein the rotational shaft extends into the first and second frameworks;
a rotor core attached to the rotational shaft, wherein the rotor core faces an inner side of the stator core; and
a first support base and a second support base fixed to the rotor, wherein the first support base and the second support base are interposed by the rotor core;
a first locking member movably coupled to the first framework, wherein the first locking member is configured to move along the axial direction of the rotational shaft toward a side of the rotor core to contact the first support base and fix the rotor;
a second locking member movably coupled to the second framework, wherein the second locking member is configured to move along the axial direction of the rotational shaft toward a side of the rotor core to contact the second support base and fix the rotor;
a first partition plate fixed to the rotor between the rotor core and a first bearing portion; and
a second partition plate fixed to the rotor between the rotor core and a second bearing portion.

7. The motor according to claim 6, wherein:
the first framework and the second framework further comprise a framework engagement portion comprising an outer ring-shaped portion and an inner ring-shaped portion defining a framework channel;
the first partition plate and the second partition plate further comprise a plate engagement portion comprising an outer ring-shaped portion and an inner ring-shaped portion defining a partition plate channel;
the first partition plate and the second partition plate are configured to engage the outer ring-shaped portion of the plate engagement portion with the framework channel and engage the inner ring-shaped portion of the framework engagement portion with the partition plate channel; and
the first partition plate and the second partition plate are rotatable integrally with the rotational shaft.

8. The motor according to claim 7, wherein the first partition plate comprises a plurality of fins on an surface of the first partition plate facing the first bearing housing and the second partition plate comprises a plurality of fins on an surface of the second partition plate facing the second bearing housing.

9. The motor according to claim 8, wherein the second framework further comprises a bracket formed with a metal material that is different from the other members; and
   wherein the bracket comprises a ring-shaped first protruding portion doubly engaged with the side of the stator core and a ring-shaped second protruding portion engaged with a groove formed in the second bearing housing.

10. The motor according to claim 9, wherein a space enclosed by the stator core, the first framework, the second framework, the first partition plate, the second partition plate, and the rotor core is substantially insulated from an outside air.

11. The motor according to claim 10, wherein the rotor further comprises a permanent magnet.

12. The motor according to claim 11, wherein the first support base has a tapered surface configured to contact the first locking member and the second support base has a tapered surface configured to contact the second locking member.

13. The motor of claim 12, wherein:
   the second framework further comprises an outward ring-shaped first protrusion at an inner opening of the second framework at a side of the second bearing housing;
   the second bearing housing further comprises a flange formed with a ring-shaped groove;
   the second framework is configured to engage the first protrusion with the groove;
   the second locking member further comprises an outward ring-shaped second protrusion; and
   the second locking member is configured to engage an outer peripheral surface of the outward ring-shaped protrusion with an inner peripheral surface of the second framework.

14. The motor of claim 12, wherein:
   the second framework further comprises an outward ring-shaped first protrusion and an inward ring-shaped second protrusion;
   the second bearing housing further comprises a flange integrally formed with a ring-shaped groove;
   the second framework is configured to engage the first protrusion with the groove; and
   the second locking member is configured to engage an outer peripheral surface of the second locking member with an inner peripheral surface of the second protrusion.

15. The motor of claim 12, wherein:
   the second framework further comprises an outward ring-shaped first protrusion formed at an end of an opening at a side of the second bearing housing;
   the second bearing housing further comprises a flange formed with a ring-shaped groove;
   the second framework is configured to engage the first protrusion with the groove;
   the second locking member further comprises an outward ring-shaped second protrusion;
   the second locking member is configured to contact an inner surface of the second framework, engage an outer peripheral surface of the second protrusion with an inner peripheral surface of the opening at the side of the second bearing housing, and engage an inner peripheral surface of the second protrusion with an outer peripheral surface of the second bearing housing.

16. The motor of claim 12, wherein:
   the second framework further comprises an outward ring-shaped first protrusion formed at an end of an opening at a side of the second bearing housing;
   the second bearing housing further comprises a flange formed with a ring-shaped groove;
   the second framework is configured to engage the first protrusion with the groove and contact an outer peripheral surface of the first protrusion with the second bearing housing;
   the second locking member further comprises an outward ring-shaped second protrusion; and
   the second locking member is configured to engage an outer peripheral surface of the second protrusion with an inner peripheral surface the opening of the second framework at the side of the second bearing housing, and engage an inner peripheral surface of the second protrusion with an outer peripheral surface of the second bearing housing.

17. A method of maintaining a motor comprising:
   removing a fixing bolt from a first framework;
   screwing a pushing bolt into the first framework, wherein a first locking member moves along a rotor into contact with a first support base of the rotor;
   removing a fixing bolt from a second framework;
   screwing a pushing bolt into the second framework, wherein a second locking member moves along the rotor into contact with a second support base of the rotor;
   wherein the contact between the first locking member and the first support base and the contact between the second locking member and the second support base fixes the rotor.

18. The method of claim 17, comprising:
   removing a bolt that fixes a first bearing housing to the first framework;
   removing the first bearing housing from the motor;
   removing a bolt that fixes an end cap to the first bearing housing;
   removing the end cap; and
   replacing an oil lubrication grease in the outer race of a bearing of the first bearing housing.

19. The method of claim 17, comprising:
   removing a bolt that fixes an end cap to a second bearing housing;
   removing the end cap;
   removing a bolt that fixes an end plate to the end of a rotational shaft of the rotor;
   removing the end plate;
   removing a bolt that fixes the second bearing housing to the second framework;
   removing the second bearing housing; and
   replacing an oil lubrication grease in the outer race of a bearing of the second bearing housing.

20. The method of claim 17, comprising:
   removing a bolt that fixes a first bearing housing to the first framework;
   removing the first bearing housing from the motor;
   removing a bolt that fixes an end cap to the first bearing housing;
   removing the end cap;
   replacing an oil lubrication grease in the outer race of a bearing of the first bearing housing;
   removing a bolt that fixes an end cap to a second bearing housing;
   removing the end cap;
   removing a bolt that fixes an end plate to the end of a rotational shaft of the rotor;

removing the end plate;
removing a bolt that fixes the second bearing housing to the second framework;
removing the second bearing housing; and
replacing an oil lubrication grease in the outer race of a bearing of the second bearing housing;
wherein the rotor remains within a stator of the motor.

* * * * *